(12) United States Patent
Ziegler et al.

(10) Patent No.: US 7,473,442 B2
(45) Date of Patent: Jan. 6, 2009

(54) MULTI-COMPONENT, WATERBORNE COATING COMPOSITIONS, RELATED COATINGS AND METHODS

(75) Inventors: Michael J. Ziegler, Cranberry Township, PA (US); William H. Retsch, Jr., Castle Shannon, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 356 days.

(21) Appl. No.: 11/226,635

(22) Filed: Sep. 14, 2005

(65) Prior Publication Data

US 2007/0059530 A1 Mar. 15, 2007

(51) Int. Cl.
*C09D 175/04* (2006.01)
*C09D 133/04* (2006.01)
*C09D 133/14* (2006.01)
*B32B 27/40* (2006.01)

(52) U.S. Cl. .................. 427/393.5; 428/412; 428/424.6; 428/424.7; 524/507; 525/127; 525/131

(58) Field of Classification Search ........................ None
See application file for complete search history.

(56) References Cited

U.S. PATENT DOCUMENTS

| | | | | |
|---|---|---|---|---|
| 4,948,829 A | * | 8/1990 | Mitsuji et al. ................ | 524/457 |
| 5,342,890 A | | 8/1994 | Sirinyan et al. ............. | 525/130 |
| 5,702,754 A | | 12/1997 | Zhong ........................ | 427/2.12 |
| 5,854,337 A | | 12/1998 | Wandelmaier et al. ...... | 524/591 |
| 5,886,082 A | * | 3/1999 | Numa et al. ................. | 524/501 |
| 6,048,620 A | | 4/2000 | Zhong ..................... | 428/424.4 |
| 6,071,621 A | | 6/2000 | Falaas et al. .............. | 428/425.8 |
| 6,231,600 B1 | | 5/2001 | Zhong ........................ | 623/1.42 |
| 6,399,691 B1 | | 6/2002 | Melchiors et al. ........... | 524/457 |
| 6,552,117 B2 | | 4/2003 | Moos et al. .................. | 524/504 |
| 6,558,798 B2 | | 5/2003 | Zhong et al. ................. | 428/420 |
| 6,709,706 B2 | | 3/2004 | Zhong et al. ................. | 427/333 |
| 6,723,121 B1 | | 4/2004 | Zhong ........................ | 623/1.46 |
| 6,825,263 B2 | | 11/2004 | Lin et al. ..................... | 524/507 |
| 6,827,983 B2 | | 12/2004 | Petzoldt et al. .......... | 427/388.3 |
| 2004/0024101 A1 | | 2/2004 | Hayes ........................ | 524/445 |
| 2004/0167271 A1 | * | 8/2004 | Maeyama et al. ........... | 524/513 |
| 2004/0260013 A1 | | 12/2004 | Richards ..................... | 524/589 |
| 2006/0121204 A1 | | 6/2006 | Nakae et al. ................. | 427/402 |

FOREIGN PATENT DOCUMENTS

| | | | |
|---|---|---|---|
| CA | 2527023 | * | 1/2005 |
| EP | 287144 | | 4/1991 |
| EP | 0 558 998 A1 | | 2/1993 |
| JP | 08209059 | * | 8/1996 |
| WO | WO 2005/000930 A1 | | 1/2005 |
| WO | WO 2005/075587 A1 | | 8/2005 |

* cited by examiner

*Primary Examiner*—David Buttner
(74) *Attorney, Agent, or Firm*—Donald R. Palladino

(57) ABSTRACT

Disclosed are multi-component waterborne coating compositions that include a first component and a second component which are mixed together prior to application of the composition to a substrate. The first component includes an aqueous dispersion of (i) a polycarbonate-polyurethane polymer, and (ii) an acrylic polyol having a number average molecular weight of no more than 5,000. The second component includes a material having functional groups reactive with the functional groups of the acrylic polyol and/or the polycarbonate-polyurethane polymer. Also disclosed are coatings formed from such compositions and substrates at least partially coated with such compositions.

10 Claims, No Drawings

MULTI-COMPONENT, WATERBORNE COATING COMPOSITIONS, RELATED COATINGS AND METHODS

FIELD OF THE INVENTION

The present invention relates to multi-component waterborne coating compositions that comprise a first component and a second component which are mixed together prior to application of the composition to a substrate. The first component comprises an aqueous dispersion of (i) a polycarbonate-polyurethane polymer, and (ii) an acrylic polyol having a number average molecular weight of no more than 5,000. The second component comprises a material having functional groups reactive with the functional groups of the acrylic polyol and/or the polycarbonate-polyurethane polymer. The present invention is also directed to coatings formed from such compositions and substrates at least partially coated with such compositions.

BACKGROUND INFORMATION

Reducing the environmental impact of coating compositions, such as that associated with emissions into the air of volatile organics during their application has been an area of ongoing investigation and development in recent years. Accordingly, interest has increased in coating compositions containing low levels of volatile organic compounds ("low VOC coating compositions").

In certain markets, such as the consumer electronics market, it is desirable to apply protective and decorative coatings to plastic substrates, such as substrates constructed of acrylonitrile butadiene styrene and/or polycarbonate, among other materials. One problem that has been associated with the application of such coatings to these types of substrates, however, is achieving adequate adhesion of the coating to the substrate. In some cases, adequate adhesion is achieved by using solventborne coatings that utilize solvents that chemically "etch" the substrate, thereby causing physical entanglement of the polymer chains of the substrate with the polymer chains in the coating. Such coating compositions, however, are incompatible with the desire to achieve environmentally friendly, low VOC coating compositions.

Other properties desirable in coating compositions suitable for application to plastic substrates are humidity resistance and hardness. Humidity resistance is a measure of the ability of a coating to remain intact and unblemished after exposure to water, while harder coatings are more resistant to scratching and marring. It would be desirable to provide waterborne coating compositions suitable for application to plastic substrates, which can exhibit good adhesion properties to such substrates, while having sufficient humidity resistance and hardness properties.

SUMMARY OF THE INVENTION

In certain respects, the present invention is directed to multi-component waterborne coating compositions. These coating compositions comprise (a) a first component comprising an aqueous dispersion comprising (i) a polycarbonate-polyurethane polymer, and (ii) an acrylic polyol having a number average molecular weight of no more than 5,000; and (b) a second component comprising a material having functional groups reactive with the functional groups of the acrylic polyol and/or the polycarbonate-polyurethane polymer.

The present invention is also directed to substrates at least partially coated with a coating deposited from such a composition, methods for at least partially coating a substrate with such a composition, and substrates at least partially coated with a multi-component composite coating comprising at least one coating layer deposited from such a composition.

In other respects, the present invention is directed to multi-component waterborne coating compositions comprising an aqueous dispersion of a polycarbonate-polyurethane polymer, wherein when the composition is deposited onto at least a portion of a plastic substrate and cured, the composition produces a coating that adheres to the substrate at least as well as a conventional multi-component solventborne polyurethane containing coating composition adheres to the same substrate when applied under the same conditions.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the specification, including the claims, are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. For example, and without limitation, this application refers to coating compositions that comprise "an acrylic polyol". Such references to "an acrylic polyol" is meant to encompass coating compositions comprising one acrylic polyol as well as coating compositions that comprise more than one acrylic polyol. In addition, in this application, the use of "or" means "and/or" unless specifically stated otherwise, even though "and/or" may be explicitly used in certain instances.

As previously indicated, certain embodiments of the present invention are directed to "multi-component" coating compositions. As used herein, the term "multi-component" means that the coating composition includes two or more components stored or packaged separately and then mixed together prior to application to a substrate. In certain embodiments of the present invention, the multi-component coating composition consists of two components.

As previously indicated, certain embodiments of the present invention are directed to "waterborne" coating compositions. As used herein, the term "waterborne" means that the solvent or carrier fluid for the coating composition primarily or principally comprises water. For example, in certain embodiments, the carrier fluid is at least 80 weight percent water.

Certain embodiments of the present invention are directed to coating compositions that are "low VOC" coating compositions. As used herein, the term "low VOC composition" means that the composition contains no more than three (3) pounds of volatile organic compounds per gallon of the composition. In certain embodiments, the coating compositions of the present invention comprise no more than one (1) pound of volatile organic compound per gallon of the coating composition. As used herein, the term "volatile organic compound" refers to compounds that have at least one carbon atom and which are released from the composition during drying and/or curing thereof. Examples of "volatile organic compounds" include, but are not limited to, alcohols, benzenes, toluenes, chloroforms, and cyclohexanes.

As previously indicated, certain embodiments of the coating compositions of the present invention comprise an aqueous dispersion comprising a polycarbonate-polyurethane polymer, in some cases an aliphatic polycarbonate-polyurethane polymer. As used herein, the term "aqueous dispersion" refers to a system wherein an organic component is in the dispersed phase as particles distributed throughout the continuous phase, which includes water. As used herein, the term "organic component" is meant to encompass all of the organic species present in the aqueous dispersion, including any polymers, as well as any organic solvents. As used herein, the term "polycarbonate-polyurethane polymer" is meant to include polymers that include repeating urethane groups,

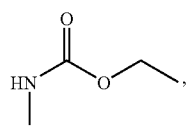

and repeating carbonate groups,

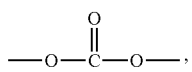

in the polymeric backbone.

As will be appreciated by those skilled in the art, such polymers may be prepared from the reaction of a hydroxy functional carbonate containing material with a polyisocyanate. Suitable hydroxy functional carbonate containing materials include the reaction product of carbonic acid, or a derivative thereof, with a diol. Examples of suitable diols include, but are not limited to, ethylene glycol, propane-1,2- and 1,3-diol, butane-1,4- and -1,3-diol, hexane-1,6-diol, octane-1,8-diol, neopentyl glycol, 1,4-bis-hydroxymethyl cyclohexane, 2-methyl-propane-1,3-diol, 2,2,4-trimethylpentane-1,3-diol, diethylene glycol, tri- and tetraethylene glycol, dipropylene glycol, polypropylene glycols, dibutylene glycol, polybutylene glycols, Bisphenol A and tetrabromo Bisphenol A. In certain embodiments, the diol component contains from 40 to 100% by weight of a hexane diol, such as hexane-1,6-diol, and/or hexane diol derivatives containing ether or ester groups in addition to terminal hydroxyl groups, e.g., the products obtained by the reaction of 1 mole of hexane diol with $\geq 1$ mole of caprolactone.

In certain embodiments, the hydroxy functional carbonate containing material is substantially linear although, in some cases, if desired, it may be branched by the incorporation of polyfunctional components, such as low-molecular weight polyols such as glycerol, trimethylol propane, hexane-1,2,6-triol, butane-1,2,4-triol, trimethylol propane, pentaerythritol, quinitol, mannitol and sorbitol, methyl glycoside and 1,4,3,6-dianhydrohexitols.

Any of a variety of suitable polyisocyanates may be used to form the polycarbonate-polyurethane polymer utilized in the coating compositions of the present invention. Suitable polyisocyanates include, but are not limited to, 1,4-tetramethylene diisocyanate, 1,6-hexamethylene diisocyanate, isophorone diisocyanate, 4,4'-methylene-bis-(cyclohexyl isocyanate), p-phenylene diisocyanate, diphenylmethane-4,4'-diisocyanate, 2,4-toluene diisocyanate, 2,6-toluene diisocyanate, triphenylmethane-4,4',4"-triisocyanate, 1,2,4-benzene triisocyanate, polymethylene polyphenyl isocyanate, the isocyanurate of hexamethylene diisocyanate, the biuret of hexamethylene diisocyanate, the isocyanurate of isophorone diisocyanate, meta-α,α,α',α'-tetramethylxylylenediisocyanate, and para-α,α,α',α'-tetramethylxylylenediisocyanate.

Aqueous dispersions of such polycarbonate-polyurethane polymers, which are suitable for use in the coating compositions of the present invention, are commercially available. Examples of such products include those available from Bayer MaterialScience AG, Pittsburgh, Pa., under the Bayhydrol® tradename, including Bayhydrol 121 (anionic dispersion of an aliphatic polycarbonate-polyurethane in water and n-methyl-2-pyrrolidine with a tensile strength of 6700 psi and an elongation at break of 150%), Bayhydrol 123 (anionic dispersion of an aliphatic polycarbonate-polyurethane polymer in water and n-methyl-2-pyrrolidine with a tensile strength of 6000 psi and an elongation at break of 320%), and Bayhydrol LS 2952 (anionic dispersion of an aliphatic polycarbonate-polyurethane polymer in water alone with a tensile strength of 5500 psi and an elongation at break of 400%). In some cases, such aqueous dispersions are substantially free or, in some cases, completely free of organic solvent, such as is the case with Bayhydrol LS 2952. As used herein, the term "substantially free" means that the material being discussed is present, if at all, as an incidental impurity. In other words, the material does not affect the properties of the composition. As used herein, the term "completely free" means that the material is not present at all.

As previously indicated, certain embodiments of the coating compositions of the present invention comprise an aqueous dispersion comprising an acrylic polyol. Acrylic polyols suitable for use in the present invention include those made by addition polymerization of different unsaturated polymerizable materials, at least one of which is a hydroxy-containing ethylenically unsaturated polymerizable material. Examples of such materials, which are suitable for use in preparing the acrylic polyol included in the coating compositions of the present invention, are vinyl monomers, such as hydroxyalkyl acrylates and methacrylates, including the acrylic acid and methacrylic acid esters of ethylene glycol and propylene glycol. These acrylates and methacrylates often have 2 to 6 carbon atoms in the alkyl group. Also suitable are hydroxy-containing esters and/or amides of unsaturated acids such as maleic acid, fumaric acid, itaconic acid and the like.

In certain embodiments, the hydroxy-containing ethylenically unsaturated polymerizable material comprises a mixture of two or more of the foregoing materials. In certain embodiments, such mixtures comprise a mixture of materials wherein at least one of the materials comprises a primary hydroxy group, such as hydroxyethyl (meth)acrylate and 1-butyl (meth)acrylate. As used herein, the term "(meth)acrylate" is meant to include both acrylates and methacrylates. In certain embodiments, such mixtures comprise at least 2 percent by weight of materials comprising a primary hydroxy group, based on the total weight of hydroxy-containing ethylenically unsaturated polymerizable materials.

In certain embodiments, the amount of hydroxy-containing ethylenically unsaturated polymerizable material used to prepare the acrylic polyol ranges from 2 to 50 percent by weight, such as 20 to 30 percent by weight, based on the weight of the total monomer combination used to prepare the acrylic polyol.

In certain embodiments, the acrylic polyol present in the coating compositions of the present invention is also made from an ethylenically unsaturated polymerizable material(s) substantially, or, in some cases, completely free of hydroxyl groups and carboxylic acid groups. Examples of such materials, which are suitable for use in preparing the acrylic polyol utilized in the coating compositions of the present invention are vinyl monomers, such as alkyl, cycloalkyl, or aryl acrylates and methacrylates having 1 to 6 carbon atoms in the esterifying group. Specific examples include methyl methacrylate and n-butyl methacrylate. Other suitable materials include lauryl methacrylate, 2-ethylhexyl methacrylate, isobornyl methacrylate, and cyclohexyl methacrylate. An aromatic vinyl monomer that is often included is styrene. Other materials that may be used are ethylenically unsaturated materials such as monoolefinic and diolefinic hydrocarbons, unsaturated esters of organic and inorganic acids, amides and esters of unsaturated acids, nitriles, and unsaturated acids. Examples of such monomers include, without limitation, 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate, as well as mixtures thereof. In certain embodiments, the amount of ethylenically unsaturated polymerizable material(s) free of hydroxyl groups and carboxylic acid groups used to prepare the acrylic polyol ranges from 40 to 98 percent by weight, such as 60 to 80 percent by weight, based on the weight of the total monomer combination used to prepare the acrylic polyol.

In certain embodiments, the acrylic polyol present in the coating compositions of the present invention is also made from an ethylenically unsaturated polymerizable material that comprises carboxylic acid groups. Virtually any unsaturated acid functional monomer may be used, for example, acrylic acid, methacrylic acid, itaconic acid, and half esters of unsaturated dicarboxylic acids such as maleic acid. In certain embodiments, the amount of ethylenically unsaturated polymerizable material that comprises carboxylic acid groups, which is used to prepare the acrylic polyol, ranges from 0.5 to 10 percent by weight, such as 2 to 4 percent by weight, based on the weight of the total monomer combination used to prepare the acrylic polyol.

In certain embodiments, the acrylic polyol described above may be synthesized from a combination of unsaturated polymerizable materials comprising (a) 2 to 50 percent by weight, such as 20 to 30 percent by weight, of hydroxy-containing ethylenically unsaturated polymerizable material(s); (b) 40 to 98 percent by weight, such as 60 to 80 percent by weight, of ethylenically unsaturated polymerizable material(s) free of hydroxyl groups and carboxylic acid groups; and (c) 0.5 to 10 percent by weight, such as 2 to 4 percent by weight, of ethylenically unsaturated polymerizable material(s) that comprise carboxylic acid groups.

In certain embodiments, the acrylic polyol has a hydroxyl number ranging from 2 to 50, such as from 20 to 30, or, in some cases, from 5 to 250 mg KOH/gram of polymer as determined by well known potentiometric techniques. In certain embodiments, the acrylic polyol contains from 0.070 to 1.400 millequivalents acid per gram of polymer solids, such as 0.250 to 0.550 millequivalents acid per gram of polymer solids.

As previously indicated, in certain embodiments of the coating compositions of the present invention the acrylic polyol is of relatively low molecular weight, i.e., it has a number average molecular weight of no more than 5,000, such as from 500 to 4000 or, in some cases, from 1000 to 3000, the molecular weight determined by gel permeation chromatography (GPC) using polystyrene as standard. In certain embodiments, such acrylic polyols also have a polydispersity index of from 1 to 7, such as 1 to 5 or, in some cases 1 to 4. As used herein, the term "polydispersity index" refers to the weight average molecular weight (Mw) divided by the number average molecular weight (Mn) of the polymer as determined by gel permeation chromatography using polystyrene standards.

In certain embodiments, an aqueous dispersion is formed comprising the acrylic polyol. A suitable method for making such an aqueous dispersion is set forth in the Examples herein. In certain embodiments, the aqueous dispersion comprising the acrylic polyol is prepared by first preparing the acrylic polymer in an organic solvent and then, prior to dispersing into water, acid groups on the acrylic polyol are neutralized with an alkaline material, such as an amine. Suitable amines that may be used for this purpose include, but are not limited to, dialkanolamines, trialkanolamines, alkylalkanolamines, and arylalkanolamines containing from 2 to 18 carbon atoms in the alkanol, alkyl, and aryl chains. Specific examples include N-ethylethanolamine, N-methylethanolamine, diethanolamine, triethanolamine, N-phenylethanolamine and diisopropanolamine. Also suitable are amines which do not contain hydroxyl groups, such as trialkylamines, diamines and mixed alkyl-aryl amines and substituted amines in which the substituents are other than hydroxyl can also be used. Specific examples of these amines are triethylamine, methylethylamine, 2-methylpropylamine, diethylamine, dipropylamine, dibutylamine, dicocoamine, diphenylamine, N-methylaniline, diisopropylamine, methylphenylamine and dicyclohexylamine. Also, amines with ring structures such as morpholine, piperidine, N-methylpiperazine and N-hydroxyethylpiperazine can be used. Ammonia can also be used and is considered for the purposes of this application to be an amine.

In certain embodiments, the continuous phase of the aqueous dispersion comprises exclusively water. In some embodiments, however, organic solvent may be present in the aqueous dispersion as well (as part of the dispersed phase) to, for example, assist in lowering the viscosity of the polymer(s) to be dispersed. For example, in certain embodiments, the aqueous dispersion comprises up to 20 weight percent, such as up to 5 weight percent, or, in some cases, up to 2 weight percent organic solvent, with weight percent being based on the total weight of the aqueous dispersion. Examples of suitable solvents which can be incorporated in the organic component of the aqueous dispersion are xylene, a ketone, such as methyl amyl ketone, methyl isoamyl ketone, and/or methyl isobutyl ketone, and/or an acetate, such as n-butyl acetate, t-butyl acetate, and/or butyl carbitol acetate.

As previously indicated, the coating compositions of the present invention comprise a first component comprising an aqueous dispersion comprising the previously described polycarbonate-polyurethane polymer and the previously-described acrylic polyol. The Examples herein describe a suitable method for making such a dispersion. In certain embodiments, the aqueous dispersion is prepared by mixing an aqueous dispersion comprising the acrylic polyol, which may be prepared as described above, with an aqueous dispersion comprising the polycarbonate-polyurethane polymer, which may comprise one or more of the commercially available products described earlier. In certain embodiments of the present invention, the amount of polycarbonate-polyurethane polymer present in the first component ranges from 5 to 50 percent by weight, such as 15 to 30 percent by weight, based on the resins solids of the first component. In certain embodiments of the present invention, the amount of acrylic polyol present in the first component ranges from 30 to 95 percent by weight, such as 60 to 80 percent by weight, based on the resins solids of the first component.

As previously indicated, the multi-component coating compositions of the present invention also comprise a second component comprising a material having functional groups reactive with the functional groups of the acrylic polyol and/or the polycarbonate-polyurethane polymer. Such a material may be referred to herein as a "curing agent" or "crosslinking agent."

Non-limiting examples of suitable curing agents include, for example, polyisocyanates that are adapted to be water soluble or water dispersible. Such materials are commercially available and include, for example, Desmodur® XP 2410, an aliphatic polyisocyanate resin based on hexamethylene diisocyanate, and Bayhydrol® VP LS 2319, a water dispersed aliphatic polyisocyanate resin, Bayhydur® 302, a water dispersible polyisocyanate resin based on hexamethylene diisocyanate, Bayhydur® VP LS 2150, a water dispersible polyisocyanate based on isophorone diisocyanate, and Bayhydur® XP 7165, a solvent-free, water dispersible polyisocyanate based on hexamethylene diisocyanate, all of which are commercially available from Bayer MaterialScience AG. Also suitable are Rhodocoat® WT 1000, WT 2092, WT 2102, XWT 2104, all of which are water dispersible polyisocyanate resins based on aliphatic polyisocyanates commercially available from Rhodia Corporation.

In certain embodiments, the material having functional groups reactive with the functional groups of the acrylic polyol and/or the polycarbonate-polyurethane polymer is present in the coating composition in an amount of 15 to 40 percent by weight, such as 20 to 30 percent by weight, based on the total weight of resin solids in the composition.

The coating compositions of the present invention can contain, in addition to the components described above, a variety of other adjuvant materials. If desired, other resinous materials can be utilized in conjunction with the aforementioned resins. Certain embodiments of the coating compositions of the present invention include surface active agents, such as any of the well known anionic, cationic or nonionic surfactants or dispersing agents.

The coating compositions of the present invention can further include inorganic and/or inorganic-organic particles, for example, silica, alumina, including treated alumina (e.g. silica-treated alumina known as alpha aluminum oxide), silicon carbide, diamond dust, cubic boron nitride, and boron carbide.

In certain embodiments, the particles comprise inorganic particles that have an average particle size ranging from 1 to 10 microns, or from 1 to 5 microns prior to incorporation into the coating composition. In other embodiments, the inorganic particles comprise aluminum oxide having an average particle size ranging from 1 to 5 microns prior to incorporation into the film-forming composition.

In certain embodiments, such inorganic particles can have an average particle size ranging from 1 to less than 1000 nanometers, such as from 1 to 100 nanometers, or, in some cases, from 5 to 50 nanometers, or, in yet other cases, 5 to 25 nanometers, prior to incorporation into the composition. These materials may constitute, in certain embodiments of the present invention, up to 30 percent by weight, such as 0.05 to 5 percent by weight, or, in some cases, 0.1 to 1 percent by weight, or, in yet other cases, 0.1 to 0.5 percent by weight, based on the total weight of the coating composition.

The coating compositions also may contain a catalyst to accelerate the cure reaction, for example, between the curing agent(s) and the acrylic polyol and/or the polycarbonate-polyurethane polymer. Examples of suitable catalysts include organotin compounds such as dibutyl tin dilaurate, dibutyl tin oxide and dibutyl tin diacetate. When used, the catalyst often is present in an amount ranging from 0.1 to 5.0 percent by weight, or, in some cases, 0.5 to 1.5 percent by weight, based on the total weight of resin solids present in the coating composition.

Other additive ingredients, for example, plasticizers, surfactants, thixotropic agents, anti-gassing agents, flow controllers, anti-oxidants, UV light absorbers and similar additives conventional in the art can be included in the compositions of the present invention. When used, these ingredients are often present in an amount of up to about 40 percent by weight based on the total weight of resin solids.

The coating compositions of the present invention also may, in certain embodiments, be formulated to include one or more pigments or fillers to provide color and/or optical effects, or opacity. Such pigmented coating compositions may be suitable for use in multi-component composite coatings as discussed below, for example, as a primer coating or as a pigmented base coating composition in a color-plus-clear system, or as a monocoat topcoat.

The solids content of the coating compositions of the present invention often ranges from 20 to 75 percent by weight, or 30 to 65 percent by weight, or 40 to 55 percent by weight, based on the total weight of the coating composition.

Suitable methods for making the coating compositions of the present invention are set forth in the Examples. Prior to application of the coating composition to a substrate, the first component and second component are mixed together. In certain embodiments, the coating compositions of the present invention have a pot life of up to 8 hours, such as up to 4 hours. As used herein the term "pot life" refers to the length of time that the coating composition remains sufficiently flowable to be coatable.

The coating compositions of the present invention can be applied to various substrates including wood, metals, glass, paper, masonry surfaces, foam, and plastic, including elastomeric substrates, among others. In some cases, the coating compositions of the present invention are particularly suitable for application to plastic substrates. As used herein, the term "plastic substrate" is intended to include any thermoplastic or thermosetting synthetic material used in injection or reaction molding, sheet molding or other similar processes whereby parts are formed, such as, for example, acrylonitrile butadiene styrene ("ABS"), polycarbonate, thermoplastic elastomer, polyurethane, and thermoplastic polyurethane, among others.

As a result, the present invention is also directed to substrates at least partially coated with a coating deposited from a coating composition of the present invention. The compositions can be applied by conventional means including brushing, dipping, flow coating, spraying and the like. The usual spray techniques and equipment for air spraying and either manual or automatic methods can be used.

After application of the coating composition of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. The film is formed on the surface of the substrate by driving material, such as water and/or volatile organic compounds (if any) out of the film by heating or by an air drying period. In some cases, the heating will only be for a short period of time, sufficient to ensure that any subsequently applied coatings can be applied to the film without dissolving the composition. Suitable drying conditions will depend on the particular composition and substrate, but, in general, a drying time of from about 1 to 5 minutes at a temperature of about 68° F. to 250° F. (20° C. to 121° C.) will be adequate. More than one coat of the coating composition may be applied to develop the optimum appearance. Between coats, the previously applied coat may be flashed, that is, exposed to ambient conditions for about 1 to 20 minutes.

The coating compositions of the present invention may be used as a single coating, a clear top coating, a base coating in a two-layered system, or one or more layers of a multi-layered system including a clear top coating composition, colorant layer and base coating composition, or as a primer layer.

In certain embodiments, the coating compositions of the present invention may be used as part of a multi-component composite coating, such as a "color-plus-clear" coating system, which includes at least one pigmented or colored base coat and at least one clear topcoat. As a result, the present invention is also directed to multi-component composite coatings, wherein at least one coating layer is deposited from a composition comprising a coating composition of the present invention. In certain embodiments, all of the layers of such a multi-component composite coating are deposited from a composition comprising a coating composition of the present invention.

For example, in certain embodiments, the coating composition from which a pigmented base coating is deposited may include a coating composition of the present invention. In such embodiments, the coating composition of the clear topcoat in the color-plus-clear system may comprise any composition useful in coatings applications, such as those typically used in automotive OEM applications, automotive refinish applications, industrial coating applications, architectural coating applications, electrocoating applications, powder coating applications, coil coating applications, and aerospace coating applications, among others. The coating composition of the clear topcoat typically comprises a resinous binder. Particularly useful resinous binders include, for example, acrylic polymers, polyesters, including alkyds, and polyurethanes, among others.

As previously indicated, certain embodiments of the coating compositions of the present invention can provide coatings that exhibit favorable adhesion to a plastic substrate. Therefore, as should be apparent from the foregoing description, the present invention is also directed to multi-component waterborne coating compositions comprising an aqueous dispersion of a polycarbonate-polyurethane polymer, wherein when the composition is deposited onto at least a portion of a plastic substrate and cured, the composition produces a coating that adheres to the substrate at least as well as a conventional multi-component solventborne polyurethane containing coating composition adheres to the same substrate when applied under the same conditions. As used herein, when it is stated that a coating "adheres to a substrate at least as well as" another coating, it means that the coating exhibits adhesion properties, measured as described in the Examples herein, equal to or superior to the adhesion properties exhibited by the coating to which it is being compared. As used herein, the term "conventional multi-component solventborne polyurethane containing coating composition" refers to a medium solids (30-45 percent solids by weight) solventborne, two component urethane monocoat, such as that commercially available from PPG Industries, Inc., Pittsburgh, Pa., as the SPECTRACRON® SPU 5000 XPM Series coatings. As used herein, when it is stated that a coating is applied "under the same conditions" as another coating, it means that the coating composition is (i) deposited on the substrate at the same or similar film thickness as the composition to which it is being compared, and (ii) cured under the same or similar cure conditions, such as cure temperature, humidity, and time, as the composition to which it is being compared.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Preparation of Acrylic Polyol Dispersion

In a 12 L glass reaction vessel equipped with a reflux condenser, a stainless steel agitator and a $N_2$ inlet, 360 g of Aromatic 100 and 180 g of Dowanol PM were introduced and heated to reflux. In a second container a primary monomer mixture of 1416 g of methyl methacrylate, 661 g of styrene, 73 g of α-methylstyrene dimer, 165 g of butyl methacrylate, 518 g of butyl acrylate and 840 g of hydroxyethyl methacrylate was prepared. In a third container an initiator solution of 251 g Lupersol 270 in 90 g Dowanol PnB was prepared. The initiator solution was pumped into the reaction vessel at a constant rate over 3 hours and 35 minutes. Five minutes after the addition of the initiator solution started, the primary monomer mixture was pumped into the reactor at a constant rate over 2 hours. In a fourth container a secondary monomer mixture of 242 g of methyl methacrylate, 189 g of styrene, 340 g of hydroxyethyl methacrylate and 113 g of acrylic acid was prepared. When the addition of the primary monomer solution was complete the secondary monomer mixture was pumped into the reaction vessel over 1 hour at a constant rate. After complete addition of the secondary monomer feed and the initiator solution the reaction was held at reflux for 30 minutes. After this hold period the reaction was cooled to 100° C. At 100° C. an amine solution of 136 g of dimethylethanolamine, 68 g of triethanolamine and 614 grams of deionized water was added to the reaction vessel dropwise from an addition funnel over 20 minutes. After complete addition of the amine solution and mixing for 15 minutes, 4905 g of deionized water was added under high agitation. The reaction was cooled to 40° C. and left to mix at this temperature overnight. The resin dispersion was filtered through a 25 micron filter. The resulting acrylic dispersion had a pH of 8.5, a solids content of 42.4%, an average particle size of 1650 angstroms, and a viscosity of 100 centipoise.

Example 2

Preparation of Coating Compositions

Samples 1 and 2 were prepared using the ingredients and amounts (in grams) shown in Table 1. The samples were prepared as follows. The first component ingredients were weighed together and processed for ~5 minutes at ~500 rpm's. The second component ingredients were weighed together and processed for ~5 minutes at ~500 rpm's. The two premixes were blended together for 2 minutes under agitation immediately prior to application.

TABLE 1

| Material | Sample 1 | Sample 2 |
|---|---|---|
| First Component | | |
| Tint Paste[1] | 112.37 | 150.20 |
| Product from Example 1 | 116.99 | 134.21 |
| Bayhydrol VP LS 2952 | 37.50 | 0.00 |
| Deionized Water | 24.83 | 20.98 |
| BYK-333[2] | 0.07 | 0.08 |
| Dowanol PNB[3] | 0.00 | 3.71 |
| Second Component | | |
| Bayhyrol VP LS 2319 | 12.77 | 15.02 |
| Desmodur XP 2410 | 12.77 | 15.02 |
| Butylcarbitol acetate[4] | 10.90 | 12.82 |

[1]Tint paste based on Sparkle Silver 3500, a commercially available aluminum flake from Silberline Manufacturing Company. The amount of paste used was such that the total pigment weight to binder weight ratio for the finished coating was 0.17 to 1.00.
[2]A polyether modified polysiloxane defoamer supplied by BYK Chemie.
[3]n-butoxypropanol supplied by Dow Chemical Company.
[4]Diethylene glycol butyl ether acetate supplied by Dow Chemical Company.

Example 3

Test Substrates

Samples 1 and 2 from Example 2 and a solventborne coating were applied to various plastic substrates. The solventborne coating was SPECTRACRON® XPM 60360S, commercially available from PPG Industries, Inc. The coatings were applied using a conventional Binks model 61 spray gun commercially available from ITW Industrial Finishing. The coatings were applied to a film thickness of ~20 microns and the painted panels were allowed to dehydrate at ambient temperature for 10 minutes. The panels were subsequently baked at 60° C. for 30 minutes. The panels were then allowed to condition under ambient conditions for 7 days. The panels were then tested, the results of which are shown in Table 2.

TABLE 2

| Material | Sample 1 | Sample 2 | Solventborne |
|---|---|---|---|
| Hardness[1] | 148 | 105 | 143 |
| MEK Resistance[2] | 4 | 4 | 4 |
| Adhesion[3] to: | | | |
| PC[4] | 5B | 0B | 0B |
| ABS[5] | 5B | 0B | 4B |
| PC/ABS[6] | 5B | 0B | 5B |
| PVC[7] | 5B | 0B | 5B |

TABLE 2-continued

| Material | Sample 1 | Sample 2 | Solventborne |
|---|---|---|---|
| Post Humidity Adhesion[8] to: | | | |
| PC[4] | 5B | 0B | 0B |
| ABS[5] | 5B | 0B | 3B |
| PC/ABS[6] | 5B | 0B | 5B |
| PVC[7] | 5B | 0B | 5B |

[1]Hardness was measured using a Konig Pendulum Hardness tester according to ASTM D4366.
[2]MEK resistance was measured according to ASTM D4752.
[3]Adhesion was measured according to ASTM D3359.
[4]LEXAN EXL 1414 polycarbonate resin commercially available from GE Advanced Materials.
[5]Dow Magnum 344 acrylonitrile-butadiene-styrene resin commercially available from Dow Chemical Company.
[6]CYCOLOY IP 1000 polycarbonate/acrylonitrile-butadiene-styrene alloy commercially available from GE Advanced Materials.
[7]MP101 Platinum DK2234 polyvinyl chloride resin from PolyOne Corporation.
[8]Post humidity adhesion was measured according to ASTM D3359 on panels which had been conditioned at 98% humidity and 60° C. for 4 days prior to adhesion testing.

As can be seen in Table 2, sample 1 which comprised a coating composition of the present invention performed at least similarly to the solventborne coating, in terms of adhesion, hardness, and humidity resistance.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the embodiments described in detail herein are illustrative only and are not limiting to the scope of the invention which is to be given the full breadth of the appended claims and any and all equivalents thereof.

We claim:
1. A method of coating a plastic substrate, comprising:
    (a) mixing together a first component of a coating composition and a second component of a coating composition to form a mixture thereof, wherein
        (1) the first component comprises an aqueous dispersion comprising:
            (i) an aliphatic polycarbonate-polyurethane polymer; and
            (ii) an acrylic polyol having a number average molecular weight of 500 to 4,000; and
        (2) the second component comprises a material having functional groups reactive with the functional groups of the acrylic polyol and/or the polycarbonate-polyurethane polymer;
    (b) applying the mixture to the plastic substrate; and
    (c) allowing the mixture to coalesce to form a substantially continuous film on the substrate,
    wherein the plastic substrate is constructed of polyvinyl chloride, acrylonitrile butadiene styrene, and/or polycarbonate.
2. The method of claim 1, wherein the aliphatic polycarbonate-polyurethane polymer has a tensile strength of 5500 psi and an elongation at break of 400%.
3. The method of claim 1, wherein the acrylic polyol is the reaction product of unsaturated polymerizable materials comprising:
    (a) 2 to 50 percent by weight of hydroxy-containing ethylenically unsaturated polymerizable material(s);

(b) 40 to 98 percent by weight of ethylenically unsaturated polymerizable material(s) substantially free of hydroxyl groups and carboxylic acid groups; and (c) 0.5 to 10 percent by weight of ethylenically unsaturated polymerizable material(s) comprising carboxylic acid groups, wherein the weight percents are based on the weight of the total monomer combination used to prepare the acrylic polyol.

4. The method of claim 1, wherein the acrylic polyol has a hydroxyl number of 2 to 50 mg KOH per gram of polymer.

5. The method of claim 1, wherein the acrylic polyol has a number average molecular weight of 1,000 to 3,000.

6. The method of claim 1, wherein the aqueous dispersion further comprises an organic solvent.

7. The method of claim 6, wherein the organic solvent comprises butyl carbitol acetate.

8. The method of claim 1, wherein the mixture is a low VOC composition.

9. The method of claim 1, wherein the plastic substrate is constructed of acrylonitrile butadiene styrene and/or polycarbonate.

10. The method of claim 9, wherein the plastic substrate is constructed of a polycarbonate/acrylonitrile butadiene styrene alloy.

* * * * *

UNITED STATES PATENT AND TRADEMARK OFFICE
CERTIFICATE OF CORRECTION

PATENT NO.        : 7,473,442 B2                                              Page 1 of 1
APPLICATION NO.   : 11/226635
DATED             : January 6, 2009
INVENTOR(S)       : Michael J. Ziegler et al.

It is certified that error appears in the above-identified patent and that said Letters Patent is hereby corrected as shown below:

Col. 13, line 2, "tree" should be --free--

Signed and Sealed this

Tenth Day of March, 2009

JOHN DOLL
*Acting Director of the United States Patent and Trademark Office*